Nov. 8, 1949  E. C. GRYCE  2,487,438
CONTROL DEVICE
Filed Feb. 21, 1946  2 Sheets-Sheet 1
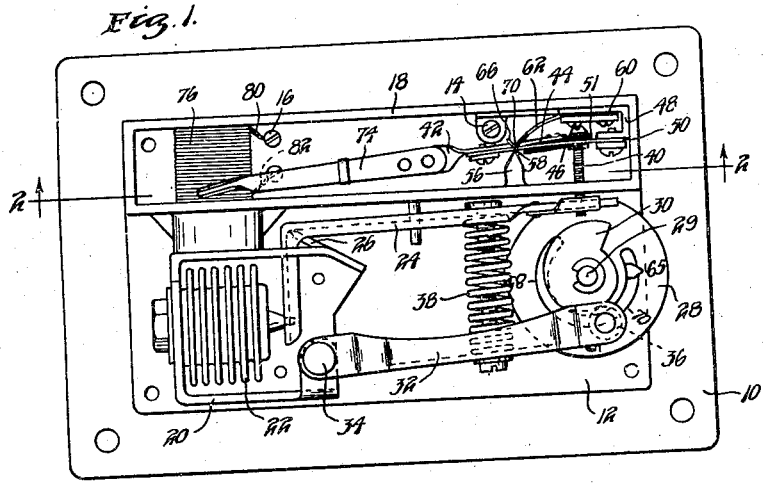
INVENTOR.
EDWIN C. GRYCE
BY
George H. Fisher
ATTORNEY Nov. 8, 1949 E. C. GRYCE 2,487,438
CONTROL DEVICE
Filed Feb. 21, 1946 2 Sheets-Sheet 2
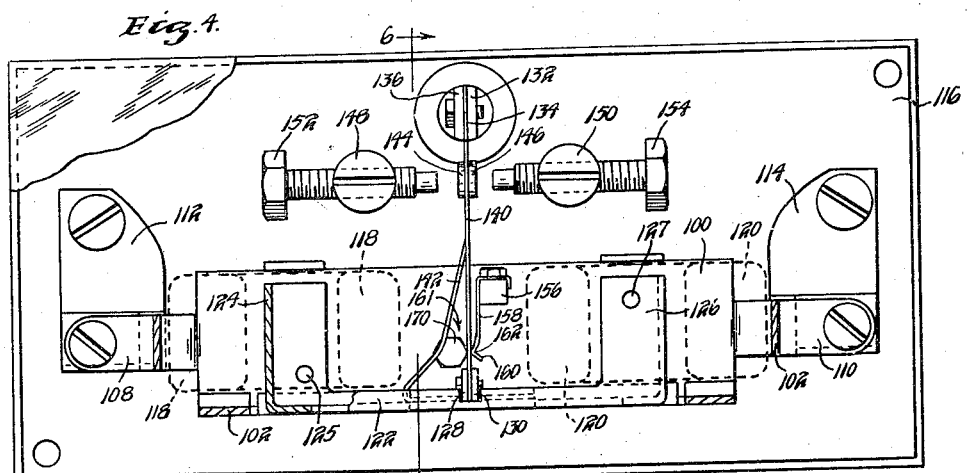
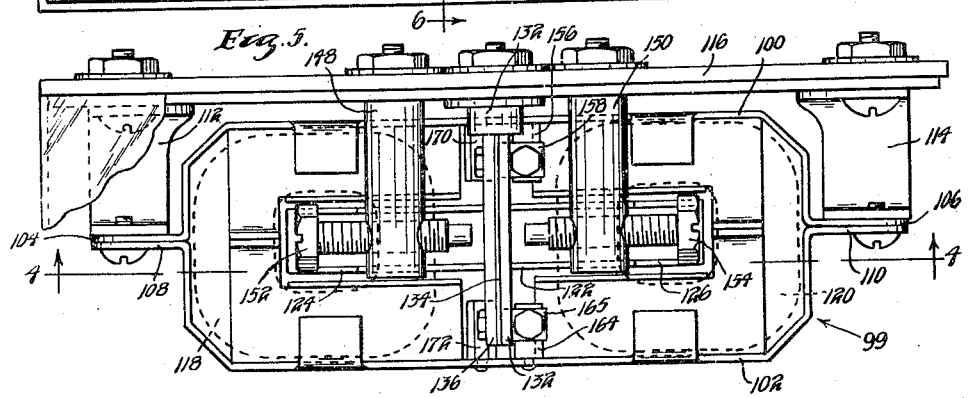
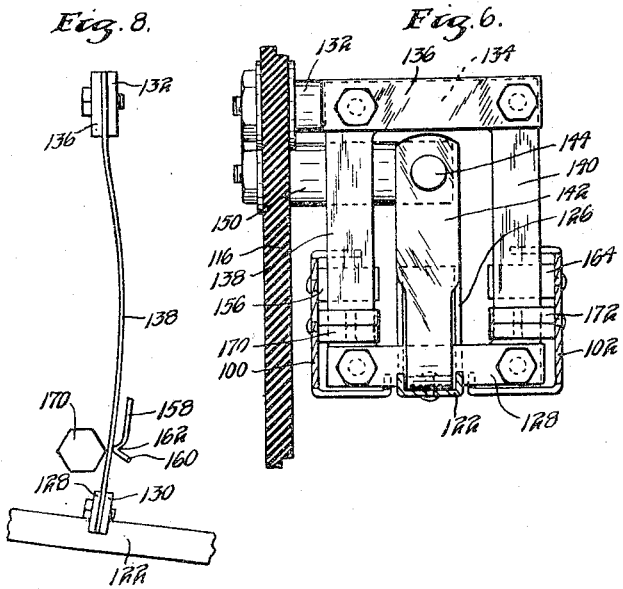
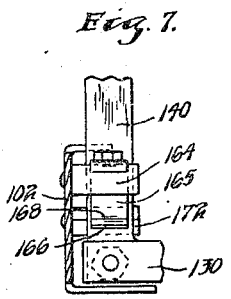
INVENTOR.
EDWIN C. GRYCE
BY
George H. Fisher
ATTORNEY Patented Nov. 8, 1949

2,487,438

UNITED STATES PATENT OFFICE 2,487,438

CONTROL DEVICE

Edwin C. Gryce, Bemidji, Minn., assignor to Minneapolis-Honeywell Regulator Company, Minneapolis, Minn., a corporation of Delaware Application February 21, 1946, Serial No. 649,349

15 Claims. (Cl. 74—99)

It is the purpose of my invention to provide control devices which have their elements so arranged that the devices will have improved operating characteristics.

It is an object of this invention to provide a flexible suspension and substantially frictionless pivot means for an actuated member of a control device wherein reed means having a relatively high spring rate is employed and having the elements of the pivot means so arranged that a relatively low spring rate is utilized in the operation of the control device.

It is another object of the invention to provide a flexible suspension and substantially frictionless pivot means for a movable element of a control apparatus which comprises a relatively long leaf spring means arranged with respect to stop means which permits small rotational movement of the movable element of the control apparatus and which also has an effective spring rate that depends on the resiliency of the entire length of the leaf spring.

It is still another object of this invention to provide pivot means for an actuated member of a control device which combines the sensitivity of a relatively long reed means and at the same time obtaining the stability of a knife-edge pivot.

It is a further object of this invention to provide a substantially frictionless pivot means for an actuated member of a control apparatus which is durable in construction yet very sensitive in operation.

Further objects will become apparent from the description and drawings forming a part of this specification.

For a more thorough understanding of this invention reference is made to the accompanying drawings in which:

Figure 1 is a top plan view of a control device embodying my novel pivot structure;

Figure 2 is a sectional view taken on line 2—2 of Figure 1;

Figure 3 is a sectional view taken on line 3—3 of Figure 2;

Figure 4 is a sectional view on line 4—4 of Figure 5 of a relay embodying the novel pivot structure;

Figure 5 is a plan view of the relay;

Figure 6 is a sectional view taken along line 6—6 of Figure 4;

Figure 7 is a fragmentary view of a portion of the pivot means; and,

Figure 8 is an elevational view, on an enlarged scale, of one of the suspension and pivot means for the armature, the armature shown actuated to the left.

Referring now to Figures 1 to 3, inclusive, 10 designates a mounting member preferably made of insulation material with a base member 12 of insulation material appropriately secured to the mounting member 10. Suitable electrical terminals 14 and 16 are mounted in the base member 12. There is a compartment member 18 formed integral with the base member 12.

There is a bracket member 20 mounted on the base 12, and a bellows 22, carried on the bracket 20, is filled with a volatile fluid such as butane or iso-butane. An L-shaped lever 24 has one arm thereof engaging the plunger of the bellows 22. There is a knife edge member 26 associated with the bracket 20 about which the lever 24 pivots.

Also secured to the base 12 is an adjustment knob 28 mounted upon a post 29. The adjustment knob 28 carries an adjustment cam 30. An arm 32 is pivoted at 34 to the bracket 20 and the opposite end of the arm supports a roller 36 which is adapted to engage the cam member 30. A tension spring 38 is connected by screw means to the arm 32 and to the lever 24 intermediate their ends.

A coil spring 40 extends through an aperture in the compartment 18 and is appropriately secured to the right-hand end of the lever 24. A resilient arm 42 is positioned in the compartment 18 and is provided with a downward extension 43 having a lateral portion 44. An insulation block 46 is secured to the lateral portion 44 and a screw means fastens the coil spring 40 to the insulation block 46. The coil spring 40 serves as a flexible connector between the resilient arm 42 and the lever 24. A bracket 48 is secured by screws to a wall of the compartment 18 at its upper righthand end. A substantially U-shaped resili.nt leaf spring or reed member 50 comprising a pair of spaced apart laterally extending legs 51 and 52 is secured to the bracket member 48. The left end of the legs 51 and 52 of the leaf spring member 50 are secured to the downward extension 43 of the resilient arm 42 by a plate member 55 and screws 54.

An abutment member 56 extends from a wall of the compartment 18 and is provided with a knife edge portion 58. The knife edge portion 58 of the butment 56 engages one side of the legs 51 and 52 of the leaf spring member 50. A resilient spring member 60 is secured to the bracket 48 and comprises depending arms 62 and 64 which are curved downwardly toward the resilient legs 51 and 52. Each arm 62 and 64 is provided with an angular portion 66, 66 respectively at its lower end. The angular portions 66, 66 of the arms 62 and 64 respectively are bent substantially at right angles with respect to the downwardly curved portion of these arms thereby forming knife edges 70 and 72. The knife edges 70 and 72 of the arms 62 and 64 resiliently engage a side of the legs 51 and 52 respectively of the leaf spring member 50 which is opposite the side on which the knife edge 58 abuts the legs 51 and 52. The knife edges 70 and 72 of the arms 62 and 64 are tangent or in alinement in substantially the same plane on the legs 51 nd 52 of the leaf spring member 50 as the knife edge 58 of the abutment 56. The knife edges 70 and 72 engage one side of the legs 51 and 52 while knife edge 58 abuts the opposite side of the legs 51 and 52 and the knife edges 70—72 and 58 being in alignment thereby form a pivot means for the resilient arm 42.

A sliding contact 74 is carried by the resilient arm 42 and is adapted to slidably engage a resistance element or potentiometer 76 mounted on a bobbin 78 mounted in the left end of the compartment 18. Electrical conductors 80 and 82 extend from the opposite ends of the potentiometer and are connected to the terminals 16—16 in the base 12.

The knife edges 70 and 72 of the arms 62 and 64 respectively engage one side of the legs 51 and 52 adjacent their left ends while the knife edge 58 engages the opposite side of the legs 51 and 52 and the knife edge 58 is positioned to be in alignment with knife edges 70 and 72 thus dividing the legs 51 and 52 into short portions spaced between the knife edges and the resilient arm 42 while there is a relatively long portion of the legs 51 and 52 spaced between the knife edges and their point of connection to the bracket 48. The resilient arms 62 and 64 have sufficient tension so that the knife edges 70 and 72 respectively will always maintain the resilient leg members 51 and 52 in engagement with the knife edge 58 when the bellows 22 upon a change in the condition actuates the slidable contact 74 over the potentiometer 76 through means of the pivoted lever 24, flexible connection 40 and the resilient arm 42.

If the temperature decreases in the space wherein the instrument is mounted, the pressure in the bellows 22 will decrease and the bellows plunger will move toward the left and the lever 24 will pivot in a clockwise direction about the knife edge 26. The flexible connecting link 40 is then pulled downwardly, thus moving the lateral portion of arm 42 downwardly. The portion of the resilient arm 42 on the left side of the pivot is moved upwardly sliding contact 74 upwardly on the potentiometer 76, and the resilient legs 51 and 52 secured to the resilient arm 42 pivot the arm 42 about the knife edges 70—72 and the knife edge 58 (see Figure 1). The knife edges 70, 72 and 58 being spaced adjacent the left end of the leaf springs legs 51 and 52 provide a substantially fixed pivot for arm 42 which will transmit equal increments of movement from the bellows 22 to the slidable contact 74. The knife edges 70 and 72 of the resilient arms 62 and 64 respectively are so spaced relative to the knife edge 58 as to permit a limited movement to the legs 51 and 52 of the leaf spring member 50 when the arm 42 is actuated by the bellows 22. During the movement of the legs 51 and 52, there is flexing or arching in the short portion of the legs 51 and 52 or that portion between the knife edges 70—72 and 58 and the resilient arm 42. There is also flexing or arching in the relatively long portion of the legs 51 and 52 or that portion between the knife edges 70—72 and 58 and their point of connection with the bracket 48. The flexing in the long and short portions of the legs 51 and 52 both affect the operation of the slidable contact 74. When the arm 42 and its sliding contact 74 is actuated in either direction with respect to the potentiometer 76, the flexing or arching adjacent the knife edge 58 is in the same direction in both the short and long portions of the legs 51 and 52. The short portion of the legs 51 and 52 has a relatively high spring rate while the long portion of the legs 51 and 52 has a relatively low spring rate, and with a pivot structure which permits movement of the legs 51 and 52, the combined spring rates of the short and long portions of the legs 51 and 52 affect the operation of the slidable contact 74. This pivot construction combines the stability of a fixed pivot and the sensitivity of a relatively long flexible spring member.

It is necessary to utilize a relatively thick or rugged leaf spring member so that the same will not break during assembly of the device or during the operation of the control device. By employing a relatively fixed pivot structure at one end of a relatively long leaf spring member, which permits movement for the leaf spring member, it is possible to utilize a very rugged leaf spring member and at the same time obtain a relatively low spring rate pivot for the slidable contact 74.

Adjustment of the knob 28 in a counterclockwise direction rotates the higher portion of the cam 30 for engaging the roller 36 and this adjustment moves the pivoted arm 32 downwardly as disclosed in Figure 1 of the drawings, increasing the tension of the spring 38. The increased tension on the spring 38 will adjust the slidable contact 74 on the potentiometer 76 through means of the lever 24, interconnecting link 40 and the resilient arm 42 with respect to a given value of the condition to which the bellows 22 responds. The bellows 22 responds to temperature changes, thus the temperature setting of the device will be varied by change of tension of the spring 38.

The relay as disclosed in Figures 4 to 8 inclusive, of the drawings is contained within a housing 99 made up of a rear portion or enclosure 100 and a cooperating front portion or enclosure 102. When the two portions 100 and 102 of the housing 99 are assembled together, angular portions 108 and 110 of the portion 102 overlap with angular portions 104 and 106 of the portion 100. Screws secure the angular portions 104 and 108 to a bracket 112 and screws secure the angular portions 106 and 110 to a bracket 114. The brackets 112 and 114 are mounted upon an insulation base 116.

Mounted in the housing 99 is a pair of spaced coils 118 and 120. An armature is designated at 122. Located at opposite ends of the armature 122 are upwardly extending cores 124 and 126 which coact with the coils 118 and 120, respectively. An aperture 125 is formed in core 124 of the armature 122 below the center of the coil 118, while an aperture 127 is formed in the core 126 of the armature 122 above the center of the coil 120. The sizes of the apertures 125 and 127 are equal and their moment arms from pivot 161 for the armature 122 are also equal. A pair of cross bars 128 and 130 are secured to the armature 122 at its mid portion. An adjustable terminal bracket 132 is appropriately secured to the base 116. A U-shaped leaf spring or reed member 134 is secured to the bracket 132 by means of a plate member 136 and appropriate screws. Legs 138 and 140 of the U-shaped leaf spring member 134 extend downwardly and have their lower ends secured between the cross bars 128 and 130 carried by the armature 122.

There is a switch blade 142, one end of which is attached to the armature 122 and the free end having spaced contacts 144 and 146. Terminal brackets 148 and 150 extending from the base 116 carry adjustable screws 152 and 154 respectively, each of which have contacts for cooperating with the contacts 144 and 146 on the switch blade 142.

An adjustable bracket 156 is mounted on the rear portion 100 of the housing 99 and a spring finger 158 is secured to the adjustable bracket 156. The finger 158 is provided with an angular portion 160 at its lower end. The angular portion 160 is bent with respect to a depending portion of the spring finger 158 to form a knife edge 162. There is an adjustable bracket 164 extending from the front portion 102 of housing 99. A spring finger 165 is secured to the bracket 164 and is formed with an angular portion 166 at its lower end which is bent with respect to a depending portion of the spring finger 165 to form a knife edge 168. The knife edge 162 and the knife edge 168 respectively abut a side of the legs 138 an 140 of the U-shaped leaf spring member 134 acjacent their lower ends. There is a hexagcnal bracket 170 adjustably mounted in the rear portion 100 of the housing. The hexagonal bracket 170 is spaced so that a portion thereof is adapted to cooperate with a side of the leg 138 of the U-shaped spring member 134. The hexagonal bracket 170 cooperates with one side of the leg 138 while the knife edge 162 engages the opposite side of the leg 138, with the abutting portion of the hexagonal bracket 170 being in alignment with the knife edge 162. A hexagonal bracket 172 is adjustably mounted in the front portion 102 of the housing 99 and a portion thereof abuts a side of the resilient leg 140 of the U-shaped leaf spring member 134 which side is opposite the side on which the knife edge 168 of the spring finger 165 abuts the leg 140. The abutting portion of the bracket 172 is in alignment with the knife edge 168.

The knife edge 162 and the abutting portion of bracket 170, knife edge 168 and the abutting portion of bracket 172 coacting with legs 138 and 140 respectively provide a fulcrum or pivot 161 about which the armature 122 rotates. Knife edge 162 and bracket 170, and the knife edge 168 and bracket 172, are positioned adjacent the lower end of the legs 138 and 140 respectively, dividing the legs 138 and 140 into a relatively short portion between the fulcrum point and the armature 122 and a relatively long portion between the fulcrum point and the bracket 132. If either coil 118 or coil 120 were energized, then the armature 122 would be rotated in either a clockwise or a counterclockwise direction and the legs 138 and 140 secured to the armature 122 would pivot the armature 122 about the knife edge 162 and bracket 170, and knife edge 168 and bracket 172. Since the portion of the legs 138 and 140 between the pivot and the armature 122 is relatively short, the armature will have a small lateral movement and as a consequence a smaller air gap is required for the coils 118 and 120. When a smaller air gap is used for the coils then a greater flux density is obtained which results in a more sensitive relay. When the armature 122 is rotated the knife edges 162 and 168 are so spaced with relation to the brackets 170 and 172 respectively that a longitudinal movement is permitted to the legs 138 and 140. The relatively short portion of the legs 138 and 140 between the fulcrum point and the armature and the relatively long portion of the legs 138 and 140 between the fulcrum point and the bracket 132 will both flex along the same curvature or in the same direction and the spring rate of the entire length of the legs 138 and 140 affects the operation of the armature 122 (see Figure 8).

In the construction of the present relay it is necessary to make a device which is sensitive in operation and which is also sufficiently rugged so that it can be quickly assembled without the breakage of parts and which will have long life in operation. Therefore, it is necessary to employ a relatively thick leaf spring member such as member 134 so that the part can be easily assembled without danger of breaking. Where the knife edges 162 and 168 are positioned on one side at the lower end of the relatively long and thick leaf spring legs 138 and 140 respectively adjacent the armature 122, and where a portion of the brackets 170 and 172 engage the opposite side of the legs 138 and 140 in alignment with the knife edges 162 and 168 respectively, with the knife edges 162 and 168 being in such spaced relationship with respect to the brackets 170 and 172 as to permit longitudinal movement to the legs 138 and 140, a substantially frictionless pivot is provided which is rugged in construction but yet sensitive in operation.

The knife edge 162 and the engaging portion of the bracket 170, the knife edge 168 and the engaging portion of the bracket 172 must be tangent at the same point on the legs 138 and 140 respectively of the leaf spring suspension member 134 so as to provide an equal spring rate for movement of the armature 122 in either direction of rotation. When the knife edges and the engaging portions of the bracket are tangent on the legs 138 and 140, no binding of the legs 138 and 140 will occur between the knife edges and brackets to restrict longitudinal motion of the leg members. It is possible to maintain the knife edge 162 and the engaging portion of the bracket 170 tangent at the same point on leg 138 by adjusting the brackets 156 and 170, respectively. It is likewise possible to maintain the knife edge 168 and the engaging portion of the bracket 172 tangent at the same point on the leg 140 by adjusting the brackets 164 and 172, respectively.

The resilient legs 138 and 140 are used as electrical connectors between the electrical terminals 148 and 150 and the electrical terminal 132, thus eliminating the need for pigtails.

When the relay is unenergized, the spring legs 138 and 140 are in an unstressed condition, and switch blade 142 is located midway between the fixed contacts carried by the screws 152 and 154, and this is due to the fact that the moments of the left-hand and right-hand portions of the armature about the effective pivot 161 are equal. This equality of the left-hand and right-hand portions of the armature 122 is provided by making the armature assembly itself symmetrical and also by so selecting the sizes and the moment arms of apertures 125 and 127 so that their moments about the effective pivot 161 are also equal.

Upon equal energization of coils 118 and 120, which is the normal condition of the coils, however, a counterclockwise torque about pivot 161 is applied to the armature 122. This counterclockwise torque of the armature 122 about pivot 161 is introduced because apertures 125 and 127 are on opposite sides of the centers of their respective coils, so that the magnetic force acting upon core 124 is essentially downward, while the magnetic force acting upon core 126 is essentially upward. When the armature 122 is moved in a counterclockwise direction by the magnetic unbalance of the relay, switch blade 142 is caused to be displaced so that electrical connection is made between contact 144 and the contact carried by the screws 152, and which movement stresses spring legs 138 and 140.

In adjusting the relay for use, after the coils 118 and 120 have been equally energized, bracket 132 is rotated in a counterclockwise direction so as to apply a force to the spring legs 138 and 140 opposing the force placed on the legs 138 and 140 due to equal energization of coils 118 and 120. When the mechanical bias is applied to the armature 122 through means of legs 138 and 140 which is just sufficient to overcome the bias applied to the armature 122 due to the equal energization of the coils 118 and 120, the switch blade 142 is returned to its central position between the contacts carried by the screws 152 and 154.

It will now be apparent that upon deenergization of the coils 118 and 120 by power failure, the mechanical bias of the armature 122 introduced by the counterclockwise rotation of bracket 132 is no longer opposed by the bias on the armature 122 provided by the coils 118 and 120 acting on the cores 124 and 126, and the armature 122 will be actuated in a clockwise direction so that switch blade 142 completes electrical connection between contact 146 and the contact carried by screw 154. When the circuit is completed between contact 146 and the contact carried by the screw 154, a controlled device will be moved to a safe position.

It is seen from the above description that I have provided control devices of novel construction which are extremely sensitive and accurate in operation and which are easy and inexpensive to manufacture.

While two embodiments of this invention have been shown and described, it is obvious that many modifications may be apparent to those skilled in the art and consequently this invention is to be limited only by the scope of the appended claims and the prior art.

I claim as my invention:

1. In a control device of the class described, comprising, in combination, a member adapted to be moved, a lever actuated thereby, an arm connected to the lever, and pivot means for the arm, the pivot means comprising leaf spring suspension means and cooperating abutment means to provide a frictionless pivot for the arm.

2. In a control device of the class described, comprising, in combination, a member adapted to be moved in response to condition changes, a lever actuated thereby, an arm connected to the lever, and pivot means for the arm, the pivot means comprising leaf spring suspension means for the arm and cooperating abutment means spaced on opposed sides of the leaf spring means adjacent where the leaf spring means is attached to the arm for providing a frictionless pivot means.

3. In a control device of the class described, comprising, in combination, a member adapted to be moved in response to condition changes, a lever actuated thereby, an arm connected to the lever, and pivot means for the arm, the pivot means comprising leaf spring suspension means secured to the arm and having a stationary abutment located on one side and a yieldable abutment spaced on the opposite side for providing a frictionless pivot means.

4. In a control device of the class described, comprising, in combination, a member adapted to be moved in response to condition changes, a lever actuated thereby, an arm connected to the lever, and a substantially frictionless pivot means for the arm, the pivot means comprising leaf spring suspension means secured to the arm and cooperating abutment means spaced adjacent one end of the leaf spring suspension means and being so arranged with respect to the leaf spring means as to utilize the spring rate of substantially the entire length of the leaf spring suspension means.

5. In a control device of the class described comprising, in combination, a member adapted to be moved, a lever actuated thereby, an arm connected to the lever, a support member, and a substantially frictionless pivot means for the arm, the pivot means comprising a relatively long leaf spring suspension means having a relatively high spring rate per unit length secured between the support member and the arm and abutment means spaced on opposed sides of the leaf spring means adjacent where the leaf spring means is secured to the arm dividing the leaf spring means into a relatively short portion between the abutment means and the arm and a relatively long portion between the abutment means and the support member, the abutment means being so arranged with respect to the leaf spring means as to permit longitudinal movement of the leaf spring means when the arm is actuated, thereby utilizing the spring rate of both the short and long portions of the leaf spring means.

6. In a device of the class described, comprising, in combination, support means, a control device, an arm associated with the control device, reed suspension means connected between the support means and the arm, abutment means associated with the reed means dividing the reed means into a short portion between the abutment means and the arm and a relatively long portion between the abutment means and the support means, and means for actuating the arm with respect to the control device, the reed means rotating about the abutment means and utilizing the resilience of both the short and long portions of the reed means to provide a sensitive movement for the arm.

7. In a device of the class described, comprising, in combination, support means, a control device, an arm associated with the control device, reed suspension means connected between the support means and the arm, and abutment means associated with the reed means providing a pivot for the arm, the abutment means permitting limited longitudinal movement for the reed means when the arm is actuated.

8. In a control mechanism of the class described, comprising, in combination, a device to be operated, a member associated with the device to be operated for controlling the operation of the device, flexible means supporting the member, and an abutment means associated with the flexible supporting means providing a pivot for the member, the abutment means permitting longitudinal movement of the flexible supporting means when the member is actuated.

9. In a control mechanism of the class described, comprising, in combination, a device to be operated, a member associated with the device to be operated for controlling the operation of said device, flexible means supporting the member, and an abutment means associated with the flexible supporting means adjacent the member providing a pivot for the member, the abutment means permitting longitudinal movement of the flexible supporting means when the member is actuated.

10. In a control mechanism of the class described, comprising, in combination, a device to be operated, a member associated with the device to be operated for controlling the operation of said device, a support means, reed means connected between the support means and the member, and an abutment means associated with the reed means adjacent the member for providing a pivot for the member, the abutment means dividing the reed means into a relatively short portion between the abutment means and the member and a relatively long portion between the abutment means and the support means, the abutment means permitting longitudinal movement of the reed means when the member is actuated.

11. In a sensitive device, a support, an arm to be positioned, a pivot for said arm comprising a resilient reed carried at one end by said support and carrying said arm at its other end, and means carried by said support engaging said reed at a point remote from its point of connection to said support, said means preventing lateral movement of the portion of said reed so engaged but permitting longitudinal movement thereof.

12. In a mechanical linkage, a support, a member having a flexible reed like portion fixed to said support, and means carried by said support engaging said member at a point remote from the connection of said flexible portion to said support, said means preventing lateral movement of the portion of said member so engaged but permitting longitudinal movement thereof.

13. In a sensitive device, a support, an arm to be positioned, a pivot for said arm comprising a resilient reed carried at one end by said support and carrying said arm at its other end, a rigid abutment carried by said support engaging one side of said reed at a point remote from the connection of said reed to said support, and a resilient abutment biasing said reed against said rigid abutment.

14. In a sensitive device, a support, a reed carried by said support, an arm to be positioned secured to said reed a substantial distance from the connection of said reed to said support, means carried by said support engaging said reed adjacent the connection between said reed and said arm for preventing lateral displacement thereof but permitting longitudinal movement thereof, and means for actuating said arm.

15. In a sensitive device, a support, a member having a rigid portion and a flexible extension the extremity of which is attached to said support, a rigid abutment carried by said support and engaging one side of said member at a point remote from the connection of said member to said support, and a resilient abutment biasing said member laterally against said rigid abutment, said abutments establishing a pivotal axis for the rigid portion of said member on said support.

EDWIN C. GRYCE.

REFERENCES CITED

The following references are of record in the file of this patent:

UNITED STATES PATENTS

| Number | Name | Date |
| --- | --- | --- |
| 1,398,792 | Paulin | Nov. 29, 1921 |
| 2,182,123 | Grisdale | Dec. 5, 1936 |
| 2,283,378 | Liner | May 19, 1942 |